United States Patent [19]

Minami et al.

[11] Patent Number: 5,140,811
[45] Date of Patent: Aug. 25, 1992

[54] EXHAUST GAS PURIFICATION DEVICE IN VARIABLE COMBINATION OF ABSORBENT AND CATALYST ACCORDING TO GAS TEMPERATURE

[75] Inventors: Takashi Minami; Toshimi Nagase, both of Toyota, Japan

[73] Assignee: Toyota Jidosha Kabushiki Kaisha, Japan

[21] Appl. No.: 603,011

[22] Filed: Oct. 25, 1990

[30] Foreign Application Priority Data

Oct. 27, 1989 [JP] Japan ................. 1-280414

[51] Int. Cl.⁵ .................................. F01N 3/28
[52] U.S. Cl. ......................... 60/297; 60/288; 422/169; 423/213.7
[58] Field of Search ............ 60/274, 297, 288; 422/169, 170, 171; 423/212, 213.5, 213.7

[56] References Cited

U.S. PATENT DOCUMENTS

| | | |
|---|---|---|
| 3,273,971 | 9/1966 | Baddorf et al. |
| 3,297,400 | 1/1967 | Eastwod . |
| 3,657,892 | 4/1972 | Perga et al. |
| 3,791,143 | 2/1974 | Keith et al. |
| 3,892,536 | 7/1975 | Roeser et al. |
| 4,425,143 | 1/1984 | Nishizawa et al. |
| 4,934,142 | 6/1990 | Hayashi ............... 60/297 |
| 4,985,210 | 1/1991 | Minami ............... 422/171 |
| 5,051,244 | 9/1991 | Dunne ................ 60/274 |

FOREIGN PATENT DOCUMENTS

| | | |
|---|---|---|
| 1205980 | 6/1986 | Canada . |
| 2214772 | 9/1973 | Fed. Rep. of Germany . |
| 3928760 | 3/1990 | Fed. Rep. of Germany . |
| 90032047 | 8/1990 | Fed. Rep. of Germany . |
| 2100029 | 2/1972 | France . |
| 57-159908 | 10/1982 | Japan . |
| 62-5820 | 1/1987 | Japan . |
| 2189309 | 8/1987 | Japan . |
| 68713 | 3/1988 | Japan . |
| 63-226070 | 9/1988 | Japan . |
| 257710 | 10/1989 | Japan . |

*Primary Examiner*—Douglas Hart
*Attorney, Agent, or Firm*—Finnegan, Henderson, Farabow, Garrett & Dunner

[57] ABSTRACT

An exhaust gas purification device for purifying exhaust gas of an engine, having an absorbent trapper absorptive of hydrocarbons in the exhaust gas up to a first gas temperature such as 200° C. while releasing the absorbed hydrocarbons in the exhaust gas above a second gas temperature such as 400° C., and a passage system responsive to the gas temperature for conducting the exhaust gas from the engine to pass through the absorbent trapper until the gas temperature rises up to the first gas temperate, to bypass the absorbent trapper when the gas temperature exceeds the first gas temperature, and to pass through the absorbent trapper and the catalytic converter in this order when the gas temperature exceeds the second gas temperature.

5 Claims, 2 Drawing Sheets

EXHAUST GAS PURIFICATION DEVICE IN VARIABLE COMBINATION OF ABSORBENT AND CATALYST ACCORDING TO GAS TEMPERATURE

BACKGROUND OF THE INVENTION

1. Field of the Invention

The present invention relates to an exhaust gas purification device, and more particularly, to a device for purifying hydrocarbons in the exhaust gases of internal combustion engines of automobiles.

2. Description of the Prior Art

Catalysts in the form of pellets or monolith are used for the purification of exhaust gases of automobiles. The purification by catalyst of toxic components in the exhaust gases, particularly hydrocarbons, are substantially affected by the temperature of the exhaust gas, and therefore, even when a precious metal catalyst is used, it is generally required that the gas temperature is not to be lower than 300° C. Therefore, when the exhaust gas temperature is low as in the operation just after the cold start up of the engine, hydrocarbons are hardly purified by the catalyst. However, since a large amount of hydrocarbons is exhausted from the engine just after the cold start up thereof, the emission of hydrocarbons in the operation at low exhaust gas temperature occupies a substantial ratio of the total emission of hydrocarbons in the operation of the engine. Therefore, it has been a problem to be solved that the emission of hydrocarbons in the cold start up operation of the engine is suppressed. It has been considered to decrease the emission of hydrocarbons by a control of engine operation. However, such a method is not desirable because it sacrifices the engine performance.

In order to meet with the above-mentioned problem it has been proposed by Japanese Utility Model Laid-open Publication 62-5820 and Japanese Patent Laid-open Publication 57-159908 to use an exhaust gas purification device which absorbs hydrocarbons in the exhaust gas at low temperature. In said publication 62-5820 an absorbent is used with a catalyst so that hydrocarbons exhausted with the exhaust gas at low temperature are absorbed by an absorbent, while at high exhaust gas temperature the hydrocarbons exhausted from the engine are purified, together with the hydrocarbons released from the absorbent, by the catalyst.

However, the materials conventionally proposed for use as the absorbent for exhaust gases are gamma alumina, porous glass, activated charcoal or the like which are not sufficient in the absorptivity. Further, these materials lose much of the absorptivity at high temperature, and therefore, when the exhaust gas temperature is in a range between the temperature at which the absorptivity starts to decrease and the temperature at which the purification by the catalyst starts to be available, hydrocarbons are exhausted with neither absorption by the absorbent nor purification by the catalyst. Therefore, there still remains in this method that the purification of hydrocarbons is not available as required.

In order to solve this problem it has been proposed by Japanese Patent Application 63-226070, corresponding to U.S. Pat. No. 4,985,210 assigned to the same applicant as the present application to employ zeolite, particularly mordenite or Y type zeolite for an exhaust gas purification device, such materials having a high absorptivity for hydrocarbons up to a relatively high temperature. The device therein proposed is designed to be an absorbent trapper which contains said mordenite or Y type zeolite therein and is mounted in the exhaust passage on the upstream side of a catalytic converter for the purpose of decreasing the emission of hydrocarbons.

However, although the mordenite or Y type zeolite shows a highest absorptivity at 200° C. for hydrocarbon gases such as $C_3H_6$, its absorptivity decreases at 300° C. to be lower than that at 200° C., though the absorptivity is still relatively high. This means that a part of the hydrocarbons absorbed by the absorbent at 200° C. would no longer be held by it at 300° C. The hydrocarbons in the exhaust gas include in addition to $C_3H_6$ paraffins, olefins and aromatics of various molecular weights which are supposed to be different in being subject to the absorptivity of absorbents, thought it is practically difficult to investigate the absorptivity to absorbents of each of a large number of hydrocarbon components included in the engine exhaust gases. However, as a result of researches conducted by the inventors of the present application with respect to the actual exhaust gases of automobiles it was confirmed that when the temperature of the gas introduced into an absorbent trapper containing mordenite or Y type zeolite as absorbent rises up to about 350° C., the hydrocarbons absorbed by the absorbent at a lower temperature starts to be released from the absorbent. Therefore, the exhaust gas purification device according to Japanese Patent Application 63-226070 having the absorbent trapper provided on the upstream side of the catalytic converter is not very effective, though better than nothing, in that the hydrocarbons absorbed by the absorbent are again released before the catalytic converter provided on the downstream side thereof becomes active, thus allowing such hydrocarbons to be emitted to the atmosphere without being purified.

SUMMARY OF THE INVENTION

Therefore, it is the object of the present invention to solve the above-mentioned problems in the conventional art of exhaust gas purification of automobiles, and to provide an exhaust gas purification device in which the absorbent of the absorbent trapper exhibits its full hydrocarbon absorbing effects, so that the total amount of emission of hydrocarbons by the time at which the catalytic purification becomes available is minimized.

According to the present invention the above-mentioned object is accomplished by an exhaust gas purification device for purifying exhaust gas of an engine, comprising an absorbent trapper containing an absorbent absorptive of hydrocarbons in the exhaust gas, a catalytic converter containing a catalyst for purifying hydrocarbons in the exhaust gas, a passage system means for conducting the exhaust gas from the engine through said absorbent trapper and said catalytic converter, a temperature detection means for detecting temperature of the exhaust gas, and a change-over valve for controlling said passage system means so as to set up a first flow line therein for the exhaust gas to flow through at least said absorbent trapper when the temperature detected by said temperature detection means is not higher than a first temperature at which the absorptivity of said absorbent for the hydrocarbons substantially start to decrease, to set up a second flow line therein for the exhaust gas to bypass said absorbent trapper when the temperature detected by said temperature detection means is at or above said first temperature and not higher than a second temperature at which the purification of the hydrocarbons by said catalytic converter becomes substantially available, and to set up a third flow line therein for the exhaust gas to flow through said absorbent trapper and said catalytic converter in said order when the temperature detected by said temperature detection means is at or higher than said second temperature.

In the above-mentioned exhaust gas purification device, said absorbent trapper and said catalytic converter may have inlets and outlets thereof, respectively, and said passage system means may comprise a first passage means for conducting the exhaust gas from the engine to said inlet of said absorbent trapper, a second passage means for connecting said outlet of said absorbent trapper with said inlet of said catalytic converter, and a third passage means for connecting an intermediate portion of said first passage means with an intermediate portion of said second passage means while bypassing said absorbent trapper.

In the above-mentioned exhaust gas purification device, said change-over valve may be provided at a conjunction of said first passage means and said third passage means so as selectively either not to obstruct said first passage means while obstructing said third passage means or to obstruct said first passage means while not obstructing said third passage means.

An absorbent material preferred for hydrocarbons is zeolite. However, tens of zeolites having respectively much different natures have been found as natural materials and are available as artificial compounds. For use in the present invention it is required that the material has a sufficiently high absorptivity for hydrocarbons up to a relatively high temperature with no lowering of the performance for a long period of use at such high temperature with high durability. As a result of researches conducted by the inventors from the above view points it was found that mordenite, Y type zeolite and ZSM-5 are most appropriate.

Therefore, in the exhaust gas purification device according to the present invention, said absorbent may be selected from a group consisting of mordenite, Y type zeolite and ZSM-5.

Further, in the exhaust gas purification device according to the present invention, said catalyst may be selected from a group consisting of oxidizing catalysts and ternary catalysts.

BRIEF DESCRIPTION OF THE DRAWINGS

In the accompanying drawings.

DESCRIPTION OF THE PREFERRED EMBODIMENTS

In the following the present invention will be described in more detail with respect to some preferred embodiments with reference to the accompanying drawings.

In order to confirm the absorptivity for hydrocarbons of zeolite with durability thereof, the absorptivity for $C_3H_6$ of mordenite, Y type zeolite, ZSM-5 and X type zeolite after heating to 800° C. for 5 hours in the atmospheric air in an electric furnace were tested. The values of absorptivity were obtained by passing a mixture of $C_3H_6$ in $N_2$ gas through the respective absorbents at a ratio of 1000 ppm as heated to 200° C., wherein the values of absorptivity were calculated from the density of $C_3H_6$ in the mixture gas before and after the passing through the absorbents.

Figure 3:
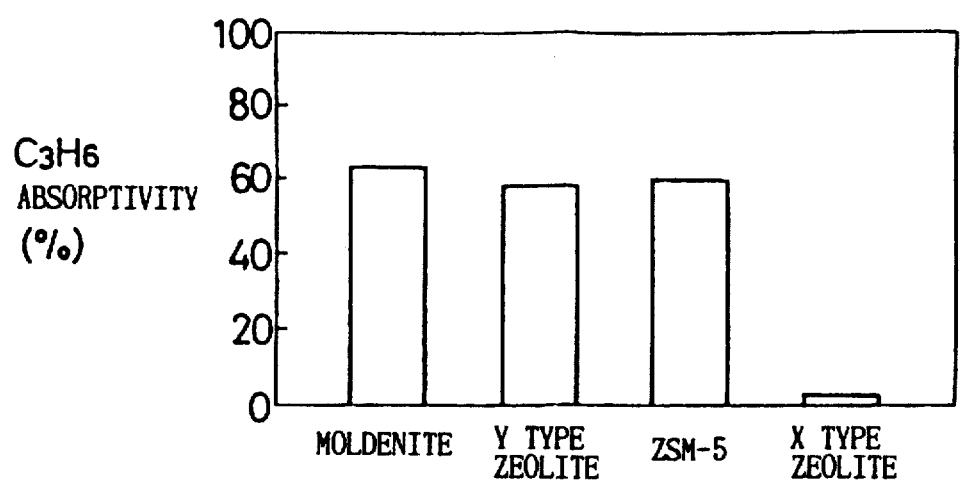
FIG. 3 is a graph showing the absorptivity for $C_3H_6$ of various zeolites.

The results are shown in FIG. 3. From these results it will be understood that mordenite, Y type zeolite and ZSM-5 are superior to X type zeolite in the absorptivity for $C_3H_6$. These materials are also good in durability. The low performance of X type zeolite is guessed due to a thermal spalling of the zeolite crystals in the X type zeolite, causing reduction of the number of micro pores in the material which can absorb $C_3H_6$.

The exhaust gas from an engine was passed through a purification device mounted in the engine bench, wherein the purification device was prepared by coating mordenite on a monolith structure (400 cells) made of cordierite so that hydrocarbons in the exhaust gas were absorbed by such an absorbent means. When the absorbent means had absorbed hydrocarbons, it was transferred to a model gas testing device, where air was passed through the absorbent means at various temperatures in order to measure the amount of hydrocarbons released from the absorbent means. As a result, as shown in Table 1 hereinunder, it was found that the release of hydrocarbons starts when the temperature of the gas entering into the absorbent means rises up to 250° C. and that the amount of released hydrocarbons increases to a high rate at 350° C.

TABLE 1

| Hydrocarbon release ratio | | | |
|---|---|---|---|
| Gas temp. entering absorbent (°C.) | 100 | 250 | 350 |
| Hydrocarbon release ratio | ca. 0.2 | 1 | ca. 4 |

The ratios in the above table are each the ratio of the amount of hydrocarbons released at each gas temperature to that at the gas temperature of 250° C.

The same tendency was observed with respect to the Y type zeolite and ZSM-5. From these results it will be understood that the mordenite, Y type zeolite and ZSM-5 absorb hydrocarbons well at low temperature, but start to release the absorbed hydrocarbons in the vicinity of 250° C., and release much of the absorbed hydrocarbons at above 350° C.

Therefore, the abosorbent trapper containing mordenite, Y type zeolite or ZSM-5 may be operated to absorb hydrocarbons in the exhaust gas of the engine until the temperature of the exhaust gas rises not to be higher than 300° C., more desirably not to be higher than 250° C., and when the temperature of the exhaust gas exceeds the above-mentioned temperature, it is desirable to bypass the flow of exhaust gas around the absorbent trapper so as to avoid the hydrocarbons absorbed by the absorbent being released therefrom. When the temperature of the exhaust gas further rises up to such a temperature as 300° C., or more desirably 350° C., at which the catalyst, for example, a ternary catalyst, contained in the catalytic converter starts to operate, then again the exhaust gas may or should desirably be passed through the absorbent so as to let the hydrocarbons absorbed by the absorbent to be released therefrom thereby regenerating the absorbent, as the hydrocarbons thus released will now be purified by the catalyst contained in the catalytic converter provided on the downstream side of the absorbent trapper. Since the temperature of the exhaust gas lowers a little when it is released from the absorbent due to a heat absorbing phase conversion thereof, it is desirable that the change-over of the flow path for the exhaust gas again to flow through the absorbent trapper is done when the temperature of the exhaust gas at the entrance of the absorbent trapper is higher than 300° C., more desirably above 350° C. so that a temperature higher than 300° C. should be ensured for the exhaust gas at the entrance of the catalytic converter.

Further, after the hydrocarbons absorbed by the absorbent have been released, i.e. the absorbent trapper has been regenerated, it is desirable that the flow path is again changed over so as to let the exhaust gas bypass the absorbent trapper in order to avoid a pressure loss caused by the absorbent trapper.

The mechanism of absorption by mordenite, Y type zeolite and ZSM-5 of hydrocarbons is not yet clear. However, in view of the fact that $C_3H_6$ is well absorbed by these absorbents at 200° C., it is guessed that the absorption is not a mere physical phenomenon. When the absorbent has fully absorbed hydrocarbons it changes its colour into black. When this black absorbent was burnt at 700° C. in the atmospheric air in an electric furnace, it was substantially discoloured. Therefore, it is guessed that a reaction of hydrocarbons occurs on the zeolite so as to generate an accumulation of carbon or compounds thereof.

In view of these, it was tested to flow the exhaust gas of an engine through an absorbent made of mordenite, and an absorbent made of mordenite and carrying platinum, respectively, over 30 hours, and then to burn the respective absorbents in the atmospheric air in an electric furnace at 650° C. for 3 hours. The absorbents thus regenerated were tested with respect to the absorptivity for $C_3H_6$. The results are shown in Table 2.

TABLE 2

| $C_3H_6$ absorption ratio | | | |
|---|---|---|---|
| mordenite | | mordenite carrying Pt | |
| before regene. | after regene. | before regene. | after regene. |
| 10% | 30% | 35% | 43% |

As seen from the test results, the absorptivity of the absorbents after a contact for 30 hours with the exhaust gas is substantially lower than that after the burning in the atmospheric air in the electric furnace. This shows that when hydrocarbons react on zeolite, the area for absorbing hydrocarbons is decreased by the products of reaction. Further, the fact that the rate of reduction of the absorptivity of the zeolite carrying platinum is relatively low shows that the catalytic action of platinum retards accumulation of the reaction products and expedites removal thereof. The same effects of platinum was observed with respect to the Y type zeolite and ZSM-5. It was also confirmed that one or two of Pd, Rh, Fe, and Cu provide similar effects as platinum when carried on the absorbent. Therefore, by adding such an element to the absorbent the regeneration of the absorbent is expedited with an availability of regeneration at a lower temperature while suppressing deterioration of the absorbent, whereby it will be allowed to broaden the range of temperature in which the bypass passage may be opened after the regeneration of the absorbent so that the pressure drop through the exhaust system is minimized.

The catalyst in the gas purification device according to the present invention may be an oxidizing catalyst, a ternary catalyst, etc. conventionally used for purifying exhaust gases. A ternary catalyst is preferred.

The carrier for the catalyst may be ceramics such as cordierite or the like or heat resisting metals such as stainless steel or the like. The carrier may have the form of monolith, pellets, foam, mesh, etc..

The passage means, a container of the absorbent trapper for containing the absorbent for hydrocarbons, a container of the catalytic converter for containing the catalyst for purifying hydrocarbons, and the change-over valve in the exhaust gas purification device according to the present invention may desirably be made of heat resisting and anti-corrosive materials such as stainless steel or the like in any shapes as required.

The operation of the change-over valve may be controlled by a control device such as a computer according to a predetermined program.

An embodiment of the exhaust gas purification device according to the present invention was constructed as follows:

A monolith carrier made of cordierite (volume 1.3 liter, 400 cells) was soaked in a slurry of H/mordenite. Then, having been taken out from the slurry, the monolith carrier was blown with air to remove pending excess slurry material, and was dried. Then the monolith carrier was burnt in an electric furnace, thus producing a absorbent body bearing a coating layer of H/mordenite, at a rate of 102 gr/liter. Similarly, a monolith carrier of the same kind was soaked in a slurry of alumina, was taken out from the slurry, was blown with air to remove pending excess slurry material, was dried, and was burnt in the electric furnace. Then, this monolith carrier was soaked in a water solution of water soluble salts of Pt and Rh, was taken out therefrom, was dried, and was burnt in the electric furnace, thus producing a catalyst body bearing Pt at a rate of 1 gr/liter and Rh at a rate of 0.15 gr/liter.

Figure 1:
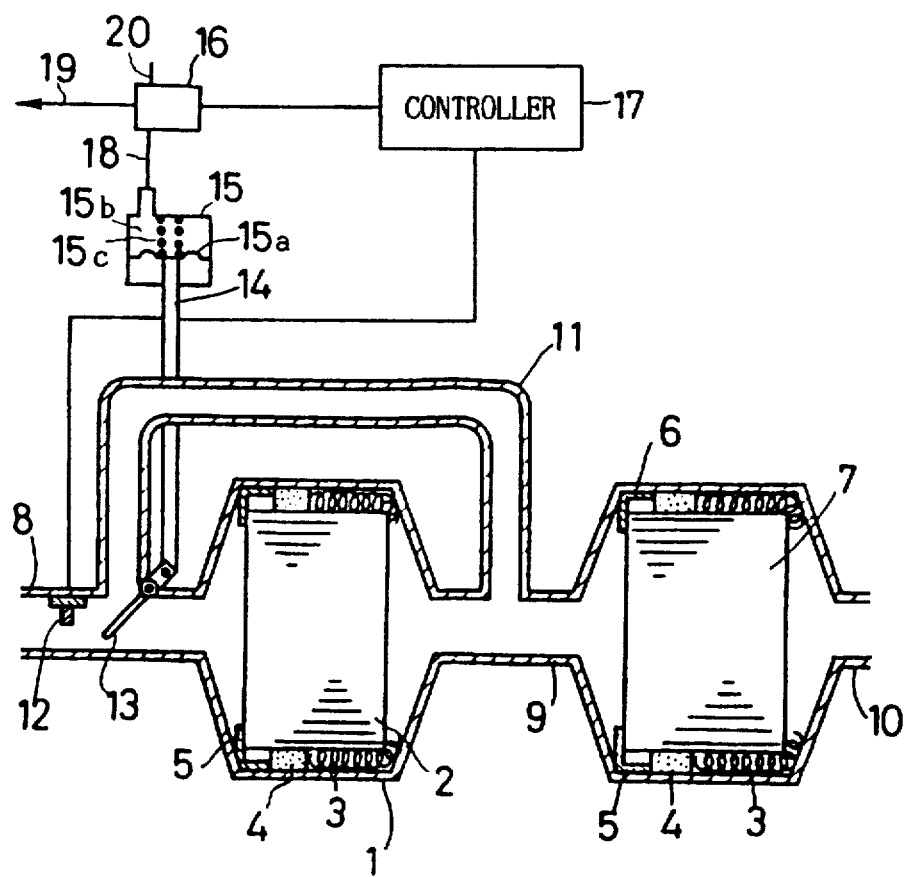
FIG. 1 a diagrammatical illustration of an embodiment of the exhaust gas purification device according to the present invention.

The absorbent body and the catalyst body thus prepared were mounted in respective containers therefor to provide an absorbent trapper and a catalytic converter, respectively. The absorbent trapper and the catalytic converter thus prepared were assembled with a temperature detection means and a change-over valve by a piping system so as to provide an exhaust gas purification device as shown in FIG. 1, wherein 1 is the absorbent trapper in which the absorbent body 2 is fixed by a wire mesh 3, a seal element 4 and fastening means 5, and 6 is the catalytic converter in which the catalyst body 7 is fixed in the same manner as in the absorbent trapper. Pipes 8, 9,10 and 11 are connected with the absorbent trapper 1 and the catalytic converter 6 in such a manner as shown in FIG. 1 that the pipe 8 conducts the exhaust gas from an engine not shown in the figure to an inlet of the absorbent trapper 1, the pipe 9 connects an outlet of the absorbent trapper 1 with an inlet of the catalytic converter 6, the pipe 10 is connected to an outlet of the catalytic converter 6 so as to conduct the exhaust gas to an appropriate place for exhaustion to the atmosphere, and the pipe 11 connects an intermediate portion of the pipe 8 with an intermediate portion of the pipe 9 so as to form a bypass passage for conducting the exhaust gas so as to bypass the absorbent trapper 1. In the pipe 8 a temperature sensor 12 is mounted to detect the temperature of the exhaust gas. Also in the pipe 8 a change-over valve 13 is mounted so as selectively to change over the flow of exhaust gas to pass through the absorbent trapper 1 or through the bypass pipe 11. The changeover valve 13 is connected with a diaphragm 15a of a diaphragm means 15 by a connecting rod 14. 16 is an electromagnetic valve for selectively connecting a diaphragm chamber 15b of the diaphragm means 15 to a vacuum source such as an intake manifold of said engine not shown through passages 18 and 19 or opening the diaphragm chamber 15b to the atmosphere through the passage 18 and a port 20, and 17 is a controller for controlling the electromagnetic valve 16 for said switching-over operation thereof.

Assuming that an engine forming the source of the exhaust gas for purification is now started up from a cold state, in this embodiment, when the temperature detected by the temperature sensor 12 is lower than 200° C., the controller 17 which receives a temperature signal from the temperature sensor 12 controls the electromagnetic valve 16 so as to open the diaphragm chamber 15b of the diaphragm means 15 to the atmosphere through the port 20, whereby the connecting rod 14 is pushed downward in the figure by a compression coil spring 15c so that the change-over valve 13 is turned in the clockwise direction in the figure so as to allow the exhaust gas to flow toward the absorbent trapper 1 while preventing it to flow through the bypass pipe 11. Therefore, in this operational condition the purification of the exhaust gas is available in the manner that the hydrocarbons included therein are absorbed by the absorbent of the absorbent trapper 1.

When the temperature sensor 12 detects that the gas temperature has exceeded 200° C., the controller 17 controls the electromagnetic valve 16 so as to connect the diaphragm chamber 15b to the vacuum source, whereby the diaphragm 15a is lifted so as to pull the connecting rod 14 up in the figure. Thus the change-over valve 13 is turned in the anti-clockwise direction so as to close the entrance to the absorbent trapper 1, while letting the flow of exhaust gas bypass the absorbent trapper 1. Therefore, in this operational condition, until the exhaust gas temperature rises to a higher temperature such as 400° C. described below, the exhaust gas is bypassed around the absorbent trapper 1 so as thereby to avoid that the hydrocarbons once absorbed by the absorbent and released therefrom are exhausted through the catalytic converter 6 without being purified with no purifying action yet available therein.

Further, when the temperature sensor 12 detects that the gas temperature has exceeded 400° C., the controller 17 controls the electromagnetic valve 16 so as again to open the diaphragm chamber 15b to the atmosphere, whereby the change-over valve 13 is turned in the clockwise direction so that the flow of exhaust gas is again passed through the absorbent trapper 1, while interrupting the bypass pipe 11. Therefore, in this operational condition, the hydrocarbons are released from the absorbent of the absorbent trapper 1 due to the decrease of the absorptivity thereof according to the heating up thereof, while the absorbent is regenerated to be ready for the next cold start up of the engine. Since the hydrocarbons released from the absorbent of the absorbent trapper 1 are now purified by the catalyst of the catalytic converter 6, they are not directly exhausted to the atmosphere.

When the engine is operated beyond a certain substantial period in which the absorbent of the absorbent trapper 1 is sufficiently regenerated, the controller 17 controls the electromagnetic valve 16 so as again to open the diaphragm chamber 15b to the vacuum source, whereby the change-over valve 13 is again turned in the anti-clockwise direction so as to close the entrance to the absorbent trapper 1 while opening the bypass pipe 11. Therefore, in this operational condition, the exhaust gas is passed only through the catalytic converter 6 so that the hydrocarbons in the exhaust gas is purified by the catalyst at a sufficiently high temperature as designed, while avoiding that the exhaust gas is uselessly passed through the absorbent trapper 1 only to cause the pressure loss.

A similar exhaust gas purification device as in the embodiment 1 was operated in the same manner, except that the absorbent body 2 was replaced by a similar one which however carries further Pt at a rate of 0.5 gr/liter. Further, for the purpose of comparison, an exhaust gas purification device was prepared by employing only the catalytic converter 6 in the embodiment 1.

Figure 2:
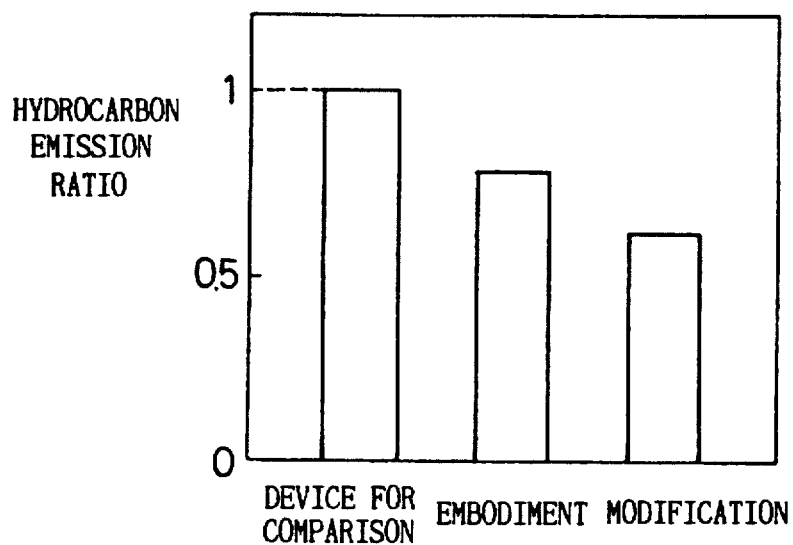
FIG. 2 is a graph showing hydrocarbon emission ratios of two embodiments and a device for comparison.

The exhaust gas purification devices according to the above-mentioned embodiment and its modification, and the device for comparison were operated for the testing at an engine bench in a manner of repeating the cycles of absorption and regeneration of the absorbent. The amount of emission of hydrocarbons in the exhaust gas was measured. The results are shown in FIG. 2, wherein the hydrocarbon emission ratio is a ratio of the emission of hydrocarbons by the embodiment, the modification and the device for comparison. It will be appreciated that the values of the mission of hydrocarbons by the embodiment and the modification are low enough to confirm that the present invention is really effective.

The emission of hydrocarbons by the modification is lower than that by the embodiment. This shows that the addition to the absorbent of the catalytic component such as platinum or the like expedites the oxidizing reaction of hydrocarbons and improves the rate of regeneration of the absorbent so that a high hydrocarbon absorptivity is maintained for a long time.

Although the invention has been described with respect to some preferred embodiments thereof, it will be understood by those skilled in the art that various modifications are possible without departing from the spirit of the present invention.

We claim:

1. An exhaust gas purification device for purifying exhaust gas of an engine, comprising an absorbent trapper containing an absorbent absorptive of hydrocarbons in the exhaust gas, a catalytic converter containing a catalyst for purifying the hydrocarbons in the exhaust gas, a passage system means for selectively conducting the exhaust gas from the engine through said absorbent trapper and said catalytic converter, a temperature detection means for detecting temperature of the exhaust gas, and a change-over valve for controlling said passage system means so that the exhaust gas: (1) flows through at least said absorbent trapper when the temperature detected by said temperature detection means is not higher than a first temperature at which the absorptivity of said absorbent for the hydrocarbons substantially starts to decrease, (2) bypasses said absorbent trapper when the temperature detected by said temperature detection means is at or above said first temperature and not higher than a second temperature at which the purification of the hydrocarbons by said catalytic converter becomes substantially available, and (3) flows through said absorbent trapper and said catalytic converter in that order when the temperature detected by said temperature detection means is at or higher than said second temperature; wherein said absorbent is selected from the group consisting of mordenite, Y type zeolite and ZSM-5, and said absorbent has added there at least one material for retarding the accumulation of reaction products resulting from the contacting of said absorbent by said hydrocarbons and expediting the removal thereof, said material being selected from the group consisting of platinum, palladium, rhodium, iron and copper.

2. An exhaust gas purification device according to claim 1, wherein said absorbent trapper and said catalytic converter each have inlets and outlets, and said passage system means comprises a first passage means for conducting the exhaust gas from the engine to said inlet of said absorbent trapper, a second passage means for connecting said outlet of said absorbent trapper with said inlet of said catalytic converter, and a third passage means for connecting an intermediate portion of said first passage means with an intermediate portion of said second passage means while bypassing said absorbent trapper.

3. An exhaust gas purification device according to claim 2, wherein said change-over valve is provided at a conjunction of said first passage means and said third passage means so as selectively either not to obstruct said first passage means while obstructing said third passage means or to obstruct said first passage means while not obstructing said third passage means.

4. An exhaust gas purification device according to claim 2, wherein said material added to said absorbent is platinum.

5. An exhaust gas purification device according to claim 1, wherein said catalyst is selected from oxidizing catalysts and ternary catalysts.

* * * * *

UNITED STATES PATENT AND TRADEMARK OFFICE
CERTIFICATE OF CORRECTION

PATENT NO. : 5,140,811

DATED : August 25, 1992

INVENTOR(S) : Takashi Minami; Toshimi Nagase

It is certified that error appears in the above-identified patent and that said Letters Patent is hereby corrected as shown below:

Abstract, line 5, after "hydrocarbons" insert
--at higher temperature, a catalytic converter active to purify hydrocarbons--.

Abstract, line 10, change "temperate" to
--temperature--.

Signed and Sealed this

Fourteenth Day of December, 1993

Attest:

BRUCE LEHMAN

Attesting Officer

Commissioner of Patents and Trademarks